May 20, 1924.
P. M. COLLINS
1,494,461
COMBINED LICENSE PLATE HOLDER, GUARD, ILLUMINATOR, TRAFFIC
AND CAUTION SIGNAL
Filed Sept. 20 1922
2 Sheets-Sheet 1
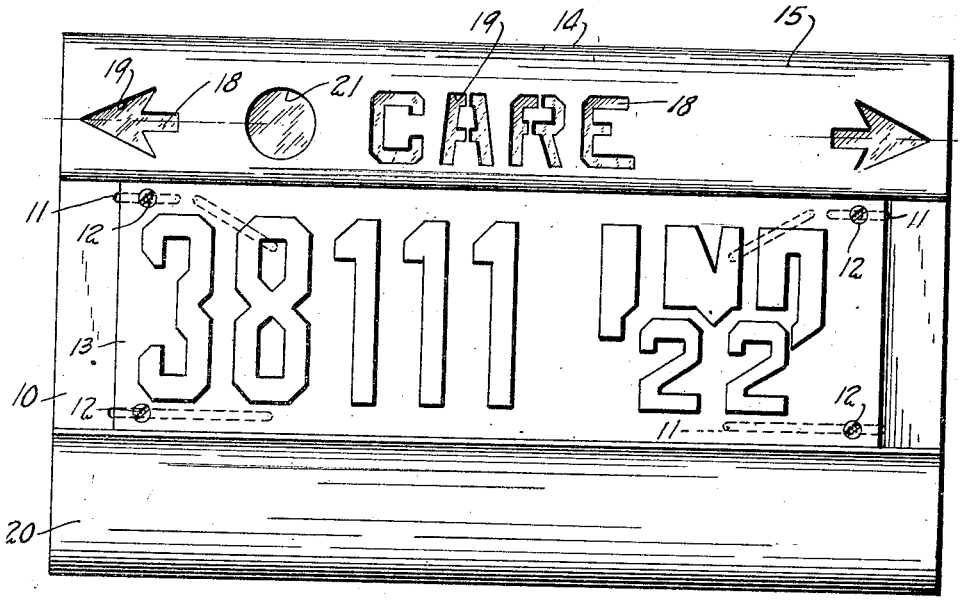
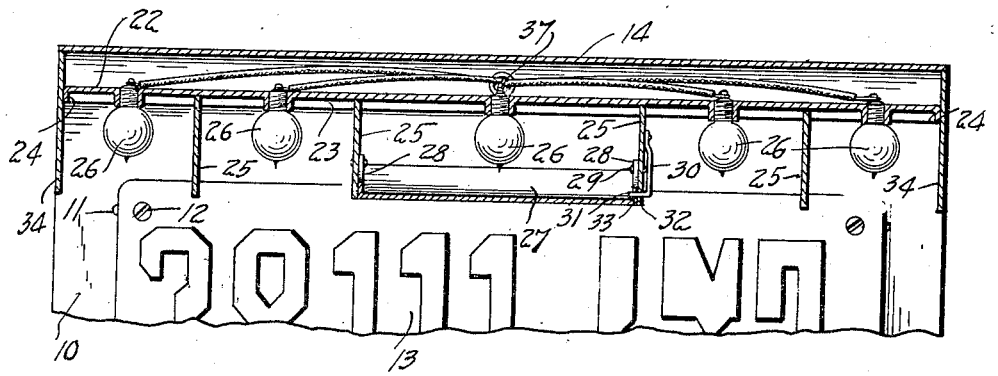
Inventor
Paul M. Collins
By Watson E. Coleman
Attorney May 20, 1924.
P. M. COLLINS
1,494,461
COMBINED LICENSE PLATE HOLDER, GUARD, ILLUMINATOR, TRAFFIC
AND CAUTION SIGNAL
Filed Sept. 20, 1922    2 Sheets-Sheet 2
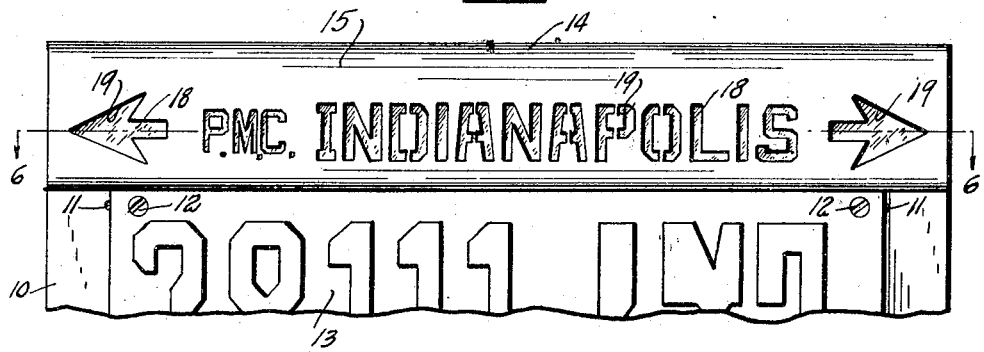
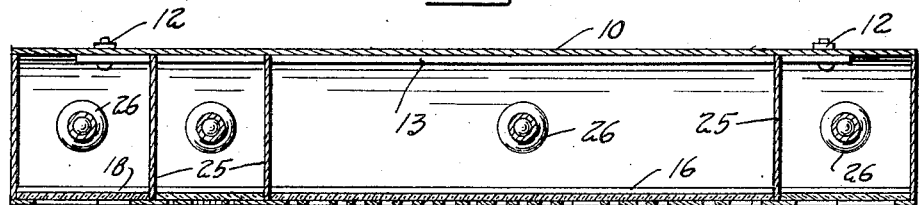
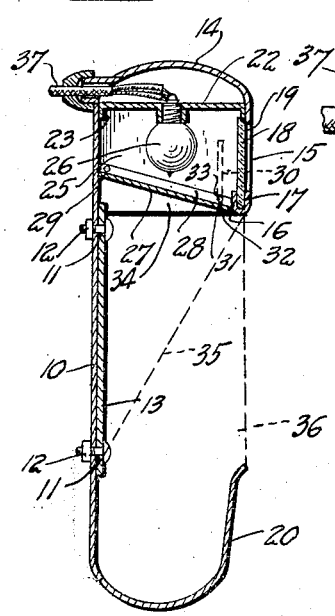
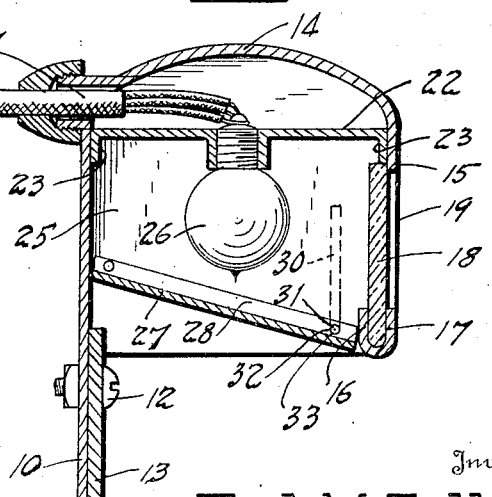
Inventor
Paul M. Collins
By Watson E. Coleman
Attorney Patented May 20, 1924.

1,494,461

UNITED STATES PATENT OFFICE.

PAUL M. COLLINS, OF INDIANAPOLIS, INDIANA.

COMBINED LICENSE-PLATE HOLDER, GUARD, ILLUMINATOR, TRAFFIC AND CAUTION SIGNAL.

Application filed September 20, 1922. Serial No. 589,395.

*To all whom it may concern:*

Be it known that I, PAUL M. COLLINS, a citizen of the United States, residing at Indianapolis, in the county of Marion and State of Indiana, have invented certain new and useful Improvements in Combined License-Plate Holders, Guards, Illuminators, Traffic and Caution Signals, of which the following is a specification, reference being had to the accompanying drawings.

This invention relates to a combined license plate holder, guard, illuminator, traffic and caution signal, and an important object of the invention is to provide a device of this character which combines in a single construction a signalling device by means of which the driver of the vehicle may indicate his intention of change of direction or speed, and means for holding the license plate so that it will be illuminated by certain of the illuminating elements of the device.

A further object of the invention is to provide a device of this character which is extremely simple in its construction and may be cheaply produced and which at the same time will be durable and efficient in service.

A still further object of the invention is to provide a license plate holder by means of which the license plate is fully illuminated and not partially so as is the common occurrence with the usual adaptation of tail light to the license plate.

These and other objects I attain by the construction and arrangement shown in the accompanying drawings wherein for the purpose of illustration is shown a preferred embodiment of my invention and wherein like reference characters designate like parts throughout.

In the drawings:—

Figure 1 is a front elevation of a rear license plate holder constructed in accordance with my invention;

Figure 2 is a fragmentary sectional view taken therethrough;

Figure 3 is a transverse sectional view taken therethrough;

Figure 4 is an enlarged detail sectional view showing the construction of the closed compartment;

Figure 5 is a fragmentary front elevation of the front license plate holder; and Figure 6 is a section on the line 6—6 of Figure 5.

Referring now more particularly to the drawings, the numeral 10 indicates a plate having attaching slots 11 formed therein for the reception of securing elements 12 by means of which a license plate 13 may be secured to the plate 10, the slots being so arranged that license plates of different sizes and different arrangements of attaching elements may be employed therewith. The attaching slots of the plate 10 are formed substantially centrally of the vertical height thereof so that the license plate is arranged approximately centrally of the plate 10. The upper end of the plate 10 is provided with an outwardly curved portion 14 which terminates in a vertical, downwardly extended flange 15 substantially paralleling the plate 10.

This flange 15 is reverted at its lower end, as indicated at 16, to form a channel 17 for the reception of the lower edge of a transparent element 18 of any desired construction which extends across the inner face of the depending flange 15. The flange 15 has formed therein character openings 19 through which the transparency 18 is visible in the form of characters designating suitable symbols, as will hereinafter more fully appear. The lower end of the plate 10 is curved outwardly and upwardly, as indicated at 20, an inner face of this portion, or that next adjacent the body of the plate 10 forming a reflector directing light upwardly and inwardly against the license plate 13 when in position. The upper flange 15 further forms a reflector for directing light inwardly and downwardly against the license plate 13, as will hereinafter more fully appear.

Where the device is being employed as a rear tail light, license plate holder and signal, the flange 15 will have formed therein at each end an indicator opening of any suitable shaping, indicating intention of the driver of the vehicle to turn in a given direction, in the present instance being indicated as openings in the form of arrows pointing in opposite directions. In the center of the casing the openings 19 will take the form of a warning word indicating intention of the driver to slacken speed or stop or start, as for example, the word Care, and at one side of the word Care, between this word and the arrow at the end of the flange an opening 21 will be formed which will serve the purpose of a tail light opening. In the use of the front indicator, the arrows will be provided in the same arrangement hereinbefore described and the central portion of the flange 15 between the arrows may be provided with any suitable indicia such as the name of the driver, as herein shown, or any other desired insignia.

Between the upper end of the flange 15 and the upper end of the plate 10, a preferably horizontally extending plate 22 is arranged having depending flanges 23 abutting against the plate 10 and flange 15, and at its ends with depending flanges 24, the purpose of which will presently appear. Depending from the plate 22 are partitions 25 secured to the plate 22 and to the side flanges 23 and having their rear edges, or that edge thereof adapted to abut against the plate 10, of less length than the front edges thereof so that the bottoms of the partitions incline downwardly toward the front of the signalling device. These partitions divide the space between the plate 10 and flange 15 below the plate 22 into a plurality of compartments, and the plate 22 has mounted therein and extending into each of these compartments a bulb 26. The plate 22 having the lower face thereof in the form of a reflector light from each of these compartments, when the bulb of the compartment is in operation, will be cast downwardly upon the license plate and the portion of this light striking against the lower reflector 20 will be thrown upwardly again against the license plate fully illuminating the same, the lights being controlled by suitable switches not herein shown, described or claimed by me.

It will be obvious that where a caution signal is employed, as in the arrangement for the rear light signal as hereinbefore described, when it is the intention of the driver of the vehicle to start, stop or slacken his speed, it is desirable that all of the light from the compartment be directed through the transparency and the openings of the flange 15 in order that the light may be sufficiently powerful to attract the attention of following vehicles. For this purpose at such signal compartments I provide a cover plate 27 consisting in a flat plate having at its side edges flanges 28. Through these flanges and through the corresponding lower edges of the partitions 25 with which the cover plate is to coact, extend pivots 29 preferably arranged at the rear eadge of the compartment. One of the partition plates 25 will have secured thereto a piece of spring wire 30 having an angular portion 31 at its free end which is adapted to be directed through aligned openings 32 and 33 formed in the partition plates 25 and in the flange 28 adjacent the free edge of the plate 27 respectively. By withdrawing the wire 30, the free edge of the plate 27 will be released and may be dropped down to replace the bulb 26 of the compartment when so desired. With this plate in closed position, all of the light of the corresponding compartment is confined to the compartment and accordingly must pass outwardly through the openings 19 of the warning signal causing the warning signal to glow brilliantly when the bulb is illuminated.

The flange 15 and plate 10 are connected by end plates 34, which end plates likewise abut the ends of the plate 22 and may be secured to the end flanges 24 thereof. The end plates 34 may be simply a short plate connecting the flange directly with the plate 10 or these plates may be formed with a depending skirt engaging the plate 10 at a lower point than the lower edge of the flange 15, as indicated by the dotted line at 35. In fact, if so desired, the plates 34 may connect not only the flange 15 and plate 10, but may likewise extend downwardly and engage with the end edges of the lower reflector 20, as indicated by the dotted line indicated at 36, these constructions being a matter of preference and design. The lead wires of the bulbs 26 extend into the space between the curved portion 14 of the plate 10 and the plate 22 which forms a housing for these lead wires, a conduit 37 engaged with the plate 10 opening into this space and receiving these lead wires to conduct the same to points desired upon the vehicle to which the device is attached.

It will be obvious that the construction hereinbefore described lends itself particularly to the purpose for which it is intended for the reason that it provides a very solid structure, permits the embodiment of the signalling device, tail light and license plate holder, and is of such construction that it will be very durable and lasting in service. It will furthermore be obvious that many changes are possible in the construction as hereinbefore set forth and I accordingly do not limit myself to such specific structure except as hereinafter claimed.

I claim:—

In combination with a plate adapted for attachment of a license plate, of a flange formed on the upper end of said plate substantially paralleling the plate and in spaced relation thereto, openings formed in said flange and providing warning signals, illuminating elements disposed intermediate said plate and flange directing light downwardly upon the license plate receiving portion thereof and outwardly through the openings of the flange, means for supporting said illuminating elements comprising a plate extending longitudinally of the first named plate intermediate said plate and flange and to which said illuminating elements are secured, partitions extending downwardly from said last named plate intermediate said illuminating elements and dividing the space between said flange and plate into a plurality of compartments, and a pivoted closure for the lower end of one of said compartments.

In testimony whereof I hereunto affix my signature.

PAUL M. COLLINS.